(12) United States Patent
Ledlie

(10) Patent No.: US 8,977,207 B2
(45) Date of Patent: Mar. 10, 2015

(54) METHODS, APPARATUSES AND COMPUTER PROGRAM PRODUCTS FOR PROVIDING AUTOMATIC MAINTENANCE OF A GEOPOSITION SYSTEM

(75) Inventor: Jonathan Ledlie, Cambridge, MA (US)

(73) Assignee: Nokia Corporation, Espoo (FI)

( * ) Notice: Subject to any disclaimer, the term of this patent is extended or adjusted under 35 U.S.C. 154(b) by 22 days.

(21) Appl. No.: 13/233,905

(22) Filed: Sep. 15, 2011

(65) Prior Publication Data

US 2013/0072216 A1     Mar. 21, 2013

(51) Int. Cl.
| | |
|---|---|
| *H04B 15/00* | (2006.01) |
| *H04B 17/00* | (2006.01) |
| *G01S 5/02* | (2010.01) |
| *H04W 4/04* | (2009.01) |

(52) U.S. Cl.
CPC .............. *G01S 5/0252* (2013.01); *H04W 4/043* (2013.01)
USPC ............ 455/62; 455/69; 455/411; 455/456.1; 455/502; 370/311; 370/338; 340/12.25

(58) Field of Classification Search
CPC .... H04W 16/14; H04W 72/082; H04W 72/02
USPC ........... 455/62, 69, 411, 452.1, 502; 370/311, 370/338; 340/12.25; 342/452
See application file for complete search history.

(56) References Cited

U.S. PATENT DOCUMENTS

| | | | | |
|---|---|---|---|---|
| 5,572,221 | A * | 11/1996 | Marlevi et al. ................. | 342/452 |
| 7,408,907 | B2 * | 8/2008 | Diener ............................ | 370/338 |
| 7,424,268 | B2 * | 9/2008 | Diener et al. ................... | 455/62 |
| 7,663,502 | B2 * | 2/2010 | Breed ........................ | 340/12.25 |
| 8,036,152 | B2 * | 10/2011 | Brown et al. .................. | 370/311 |
| 8,045,960 | B2 * | 10/2011 | Orakkan ........................ | 455/411 |

(Continued)

FOREIGN PATENT DOCUMENTS

| | | |
|---|---|---|
| EP | 2056532 A1 | 5/2009 |
| WO | WO 2010/106530 A2 | 9/2010 |

OTHER PUBLICATIONS

Bolliger, Philipp, et al., "Improving Location Fingerprinting through Motion Detection and Asynchronous Interval Labeling," *Fourth International Symposium on Location- and Context-Awareness (LoCA 2009)*, May 7-8, 2009, 15 pages, Springer-Verlag, Japan.

(Continued)

*Primary Examiner* — William D Cumming
(74) *Attorney, Agent, or Firm* — Alston & Bird LLP

(57) ABSTRACT

An apparatus for augmenting associations between places and fingerprints may include a processor and memory storing executable computer code causing the apparatus to at least perform operations including detecting items of fingerprint data from one or more beacon devices, as the apparatus traverses one or more physical places. The fingerprint data may correspond to generated summaries of radio information corresponding to the physical places. The computer program code may further cause the apparatus to detect that the apparatus is stationary in at least one of the physical places for a predetermined time period and determine a location of the apparatus in the physical place based in part on determining fingerprint data, detected from a subset of the beacon devices which are in the physical place, that most accurately resembles canonical fingerprint data corresponding to one of a plurality of physical places. Corresponding methods and computer program products are also provided.

20 Claims, 8 Drawing Sheets

(56) References Cited

U.S. PATENT DOCUMENTS

| | | | |
|---|---|---|---|
| 8,175,539 B2 * | 5/2012 | Diener et al. | 455/69 |
| 8,219,129 B2 * | 7/2012 | Brown et al. | 455/502 |
| 2006/0089153 A1 | 4/2006 | Sheynblat | |
| 2010/0127887 A1 | 5/2010 | Ledlie et al. | |
| 2011/0207474 A1 | 8/2011 | Hazzani et al. | |
| 2011/0269479 A1 | 11/2011 | Ledlie | |
| 2011/0306354 A1 | 12/2011 | Ledlie et al. | |
| 2012/0208500 A1 | 8/2012 | Ledlie et al. | |
| 2013/0072216 A1 * | 3/2013 | Ledlie | 455/456.1 |

OTHER PUBLICATIONS

Shafer, Ilari, et al., "Movement Detection for Power-Efficient Smartphone WLAN Localization," *Proceedings of the 13th ACM International Conference on Modeling, Analysis, and Simulation of Wireless and Mobile Systems (MSWiM)*, Oct. 17-21, 2010, 10 pages, Turkey.

Kim, Donnie H., et al., "SensLoc: Sensing Everyday Places and Paths Using Less Energy," *Proceedings of the 8th ACM Conference on Embedded Networked Sensor Systems (SenSys)*, Nov. 3-5, 2010, 14 pages, Switzerland.

Ledlie, Jonathan, et al., "Molé: A Scalable, User-Generated WiFi Positioning Engine," 2011 *International Conference on Indoor Positioning and Indoor Navigation (IPIN)*, Sep. 21-23, 2011, 10 pages, Portugal.

International Searching Authority, International Search Report and Written Opinion for International Application No. PCT/FI2012/050806, Dec. 17, 2012, 12 pages, National Board of Patents and Registration of Finland, Finland.

* cited by examiner

US 8,977,207 B2

METHODS, APPARATUSES AND COMPUTER PROGRAM PRODUCTS FOR PROVIDING AUTOMATIC MAINTENANCE OF A GEOPOSITION SYSTEM

TECHNOLOGICAL FIELD

An example embodiment of the invention relates generally to geolocation of communication devices and more particularly, relates to a method, apparatus, and computer program product for detecting locations of communication devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to geolocation services of communication devices. These geolocation services may be utilized to determine current locations of communication devices in the real-world. For a variety of reasons, it may be beneficial for a communication device to determine its current location. For example, applications of a communication device may request the current location of the communication device to enhance one or more services provided by the applications. Additionally, for example, the user of the communication device may desire to know the current location.

At present, most outdoor location systems use a Global Positioning System (GPS) which may compute a location of a communication device by triangulating distance to a set of satellites. However, GPS may only function well in outdoor regions with substantial sky visibility. For instance, a communication device may utilize a radio receiver for receiving GPS transmissions from satellites to estimate the current location of the communication device. However, it may be difficult for the communication device to receive the transmissions from the satellites in an indoor environment or in urban areas, for example. The difficulty in receiving the transmissions from the satellites in some instances may negatively impact the ability of the communication device to determine its current location. As such, alternative approaches may be utilized for detecting a current location of a communication device in instances in which GPS may be limited.

An example of an alternative approach for determining a current location of a communication device relates to analyzing radio frequency (RF) signals of wireless access points or signals from cellular towers. In this regard, for example, a communication device may detect signals received from one or more radio beacon access points or cellular towers in an area of the communication device and the communication device may provide the data associated with the detected signals to a positioning system. The positioning system may analyze the data of the detected signals to estimate a current location for the communication device.

One problem with this approach of determining the location of a communication device is that it may not be reliable and may grow stale over time. For example, this may occur because the cellular towers and access points may be moved, added or deleted from a system or location over time. When the location information associated with the cellular towers and access points becomes stale, a geopositioning system may be less able to differentiate between nearby spaces, since the location information of the nearby spaces may become more similar to each other.

In view of the foregoing drawbacks, it may be beneficial to provide an efficient and reliable mechanism of determining one or more locations of a communication device and for more reliably creating a location-based geopositioning system that is accurate over time.

BRIEF SUMMARY

A method, apparatus and computer program product are therefore provided for determining one or more locations of a communication device. In some example embodiments, a beacon-based geopositioning system may be provided. In this regard, an example embodiment may detect and assign a fingerprint(s) to a place(s) and may estimate or determine the location of a communication device based in part on determining a closest match to corresponding prestored (e.g., cached) fingerprint data associated with the place(s). The prestored fingerprint data may be stored in a memory (e.g., in a fingerprint database, that may be shared across devices).

The example embodiments may evaluate factors associated with a communication device(s). The factors may relate to an idleness of the communication device and the one or more scores relating to the confidence that the communication device is within one or more locations. In this regard, the communication device may create one or more automatic binds (e.g., linking a fingerprint(s) to a place(s)) in an instance in which the communication device is confident that it has been in the same correct place for an extended time period.

As such, an example embodiment may utilize a device (e.g., an accelerometer) to detect idleness of the communication device in combination with the score that is assigned to each potential place that the communication device may be located and the place assigned the highest score may be determined to be the location that the communication device is within. When the device has been idle or stationary for an extended time period, and the communication device may be confident in the current estimate of the location, the communication device may generate an automatic bind(s). For example, the communication device may generate an automatic reinforcing/maintaining bind(s) that identifies fingerprint data of the current place and augments existing fingerprint data associated with the current place to update the existing fingerprint data based on the fingerprint data for the current place being detected by the communication device.

In one example embodiment, a method for augmenting one or more associations between places and fingerprints is provided. The method may include detecting one or more items of fingerprint data received from one or more beacon devices, as a device traverses one or more physical places. The fingerprint data may correspond to one or more generated summaries of radio information corresponding to the one or more physical places. The method may further include detecting that the device is stationary in at least one of the physical places for a predetermined time period. The method may also include determining a location of the device in the physical place based in part on determining fingerprint data detected from a subset of the beacon devices which are in the physical place that most accurately resembles canonical fingerprint data corresponding to one of a plurality of physical places.

In another example embodiment, an apparatus for augmenting one or more associations between places and fingerprints is provided. The apparatus may include a processor and a memory including computer program code. The memory and computer program code are configured to, with the processor, cause the apparatus to at least perform operations including detecting one or more items of fingerprint data received from one or more beacon devices, as the apparatus traverses one or more physical places. The fingerprint data may correspond to one or more generated summaries of radio information corresponding to the one or more physical places. The computer program code may further cause the apparatus to detect that the apparatus is stationary in at least one of the physical places for a predetermined time period. The computer program code may further cause the apparatus to determine a location of the apparatus in the physical place based in part on determining fingerprint data detected from a subset of the beacon devices which are in the physical place that most accurately resembles canonical fingerprint data corresponding to one of a plurality of physical places.

In another example embodiment, a computer program product for augmenting one or more associations between places and fingerprints is provided. The computer program product includes at least one computer-readable storage medium having computer-readable program code portions stored therein. The computer-executable program code instructions may include program code instructions configured to detect one or more items of fingerprint data received from one or more beacon devices, as a device traverses one or more physical places. The fingerprint data may correspond to one or more generated summaries of radio information corresponding to the one or more physical places. The program code instructions may also detect that the apparatus is stationary in at least one of the physical places for a predetermined time period. The program code instructions may also determine a location of the device in the physical place based in part on determining fingerprint data detected from a subset of the beacon devices which are in the physical place that most accurately resembles canonical fingerprint data corresponding to one of a plurality of physical places.

An embodiment of the invention may provide a better user experience since communication devices may be able to efficiently and reliably differentiate between nearby spaces for locating places. As a result, device users may enjoy improved capabilities with respect to location based services accessible via the device.

BRIEF DESCRIPTION OF THE SEVERAL VIEWS OF THE DRAWINGS

Figure 1:
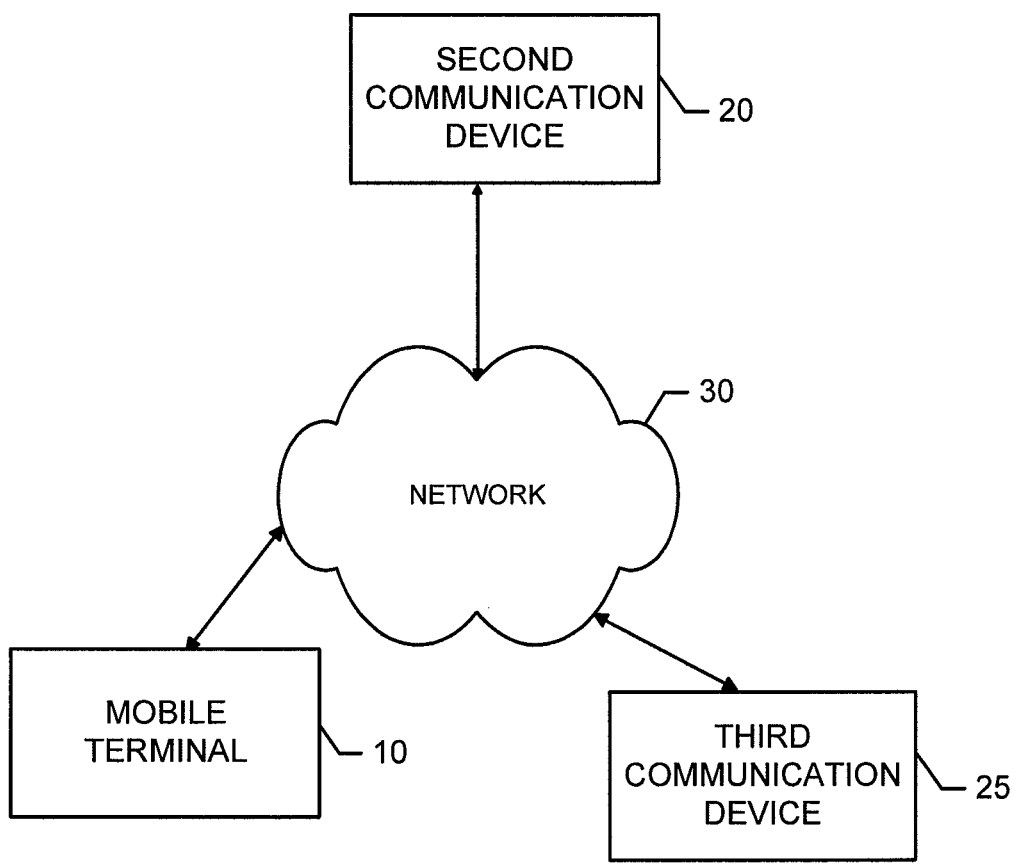
Figure 2:
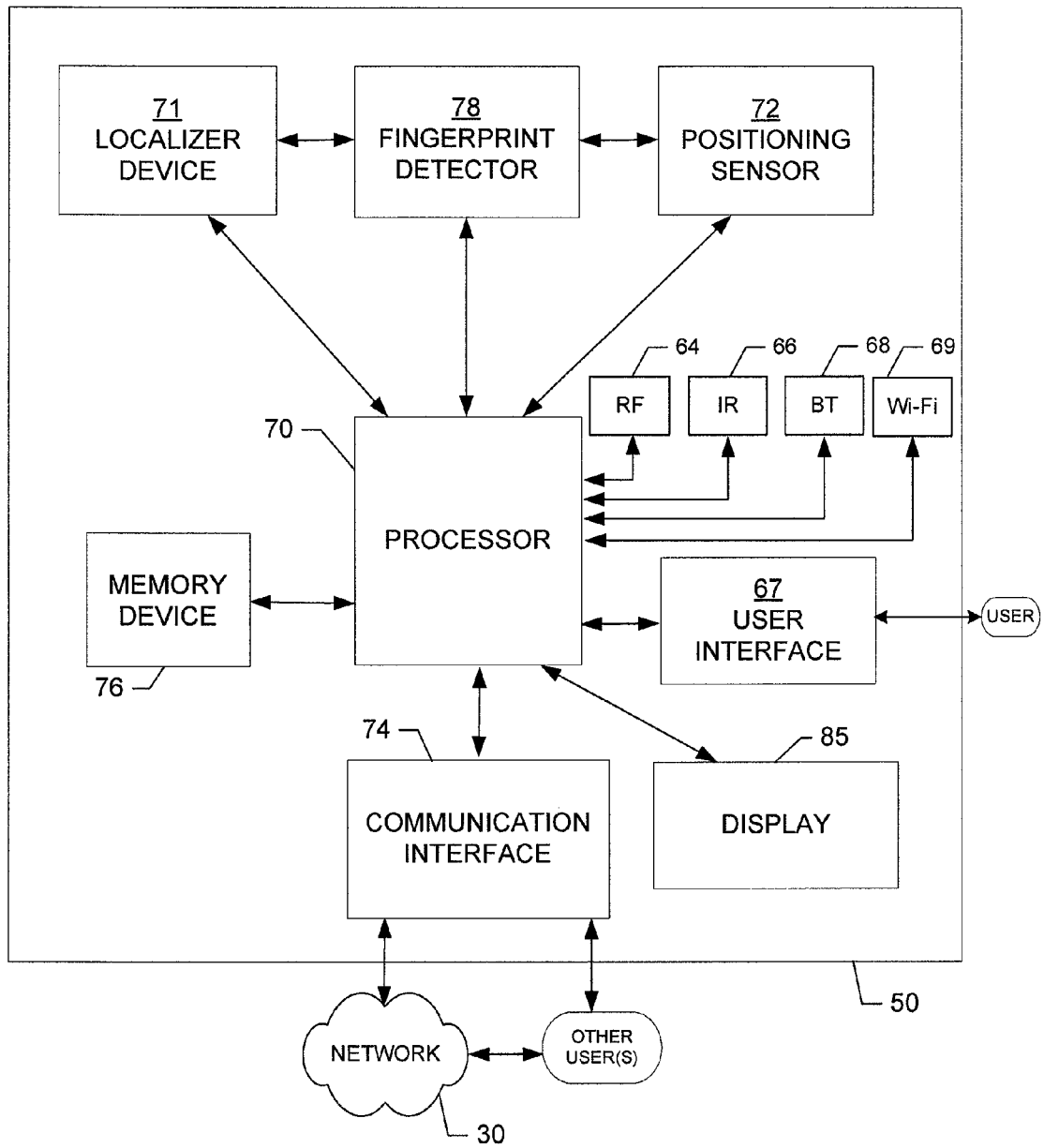
Figure 3:
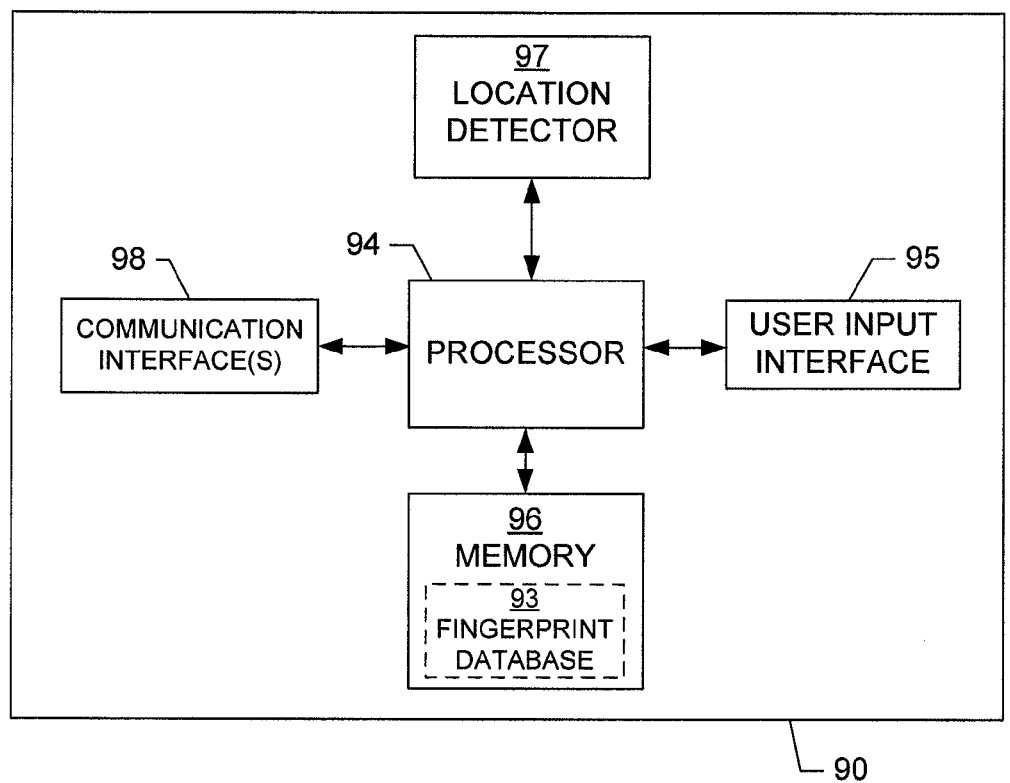
Figure 4:
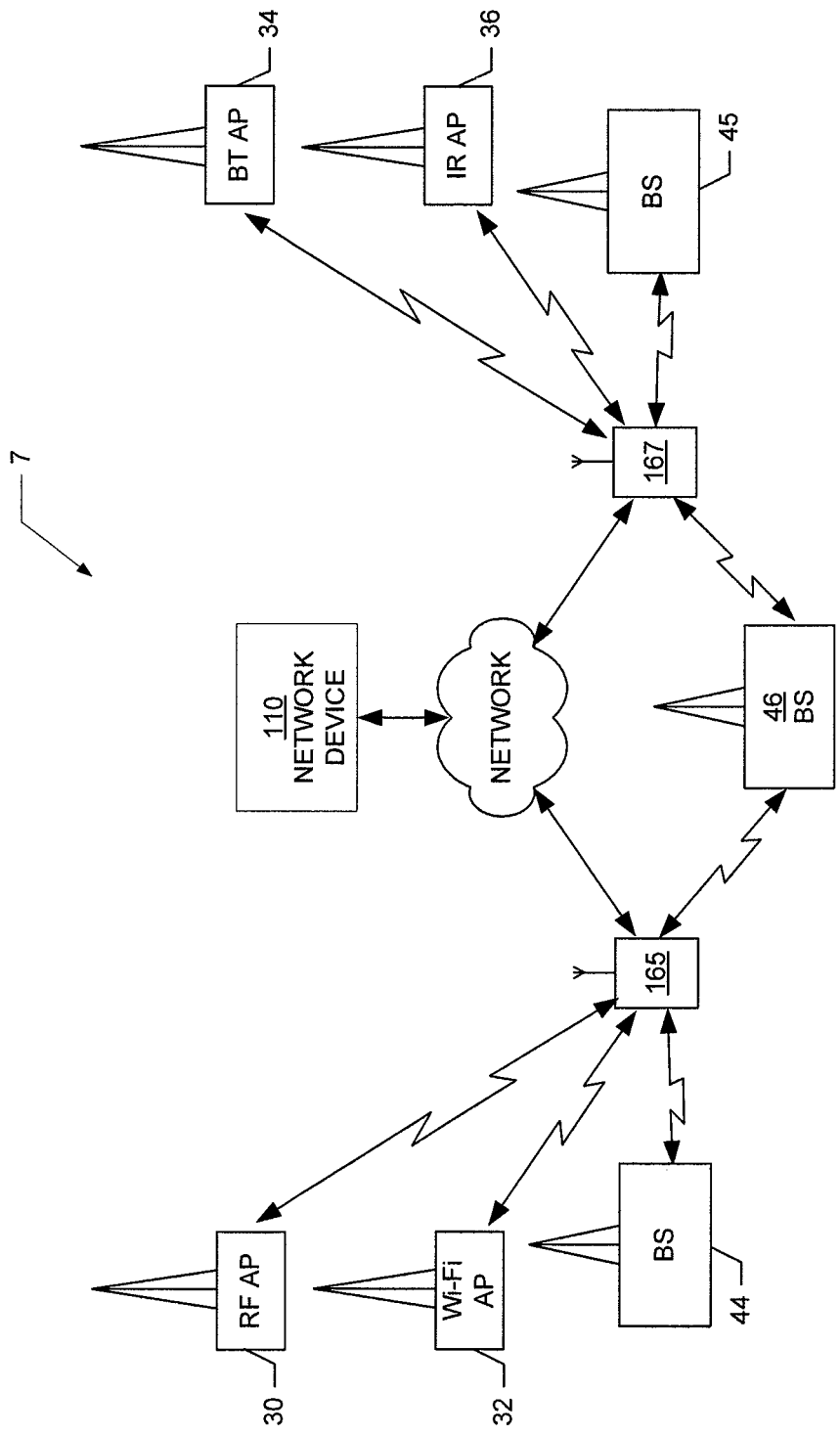
Figure 5:
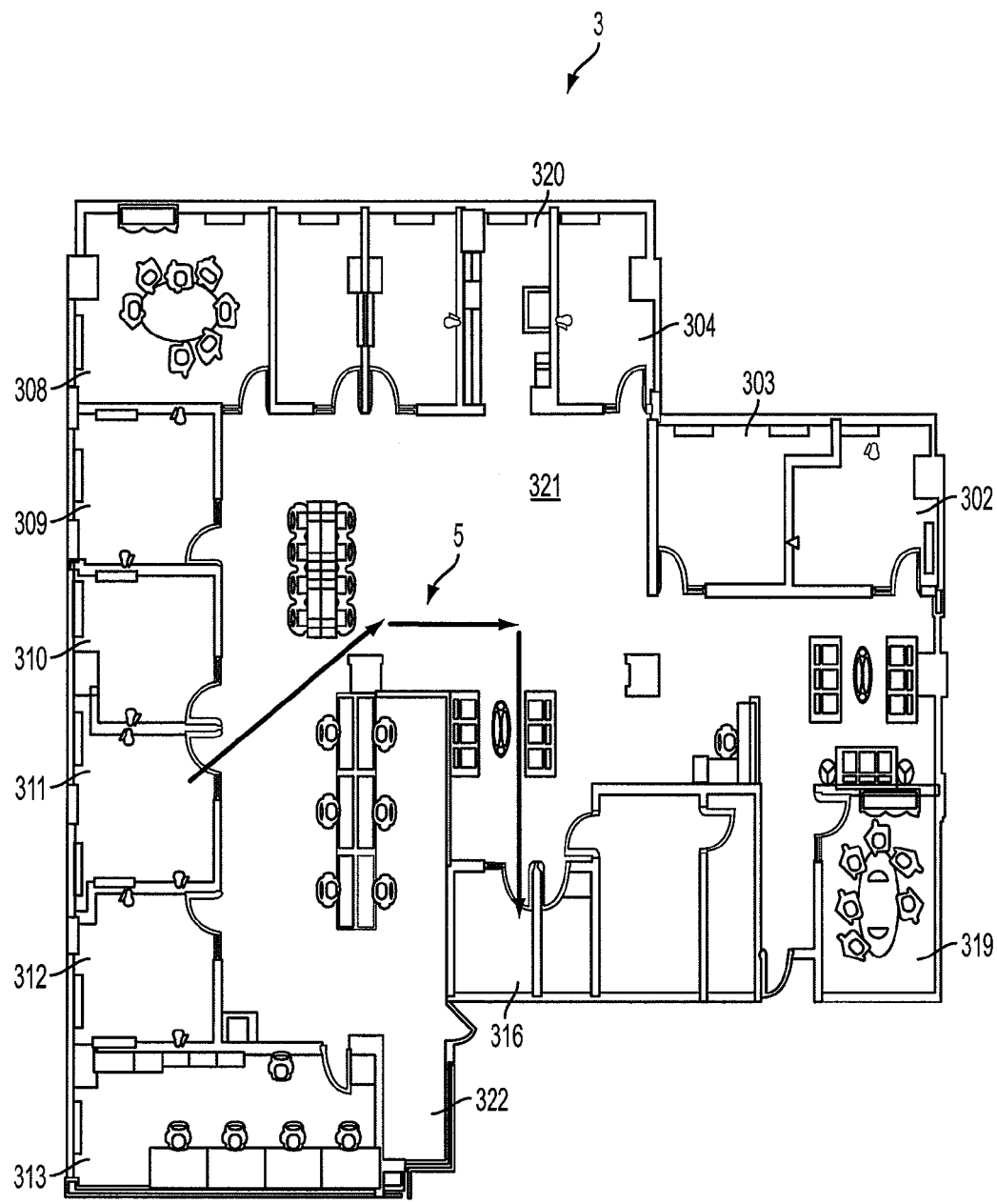
Figure 6:
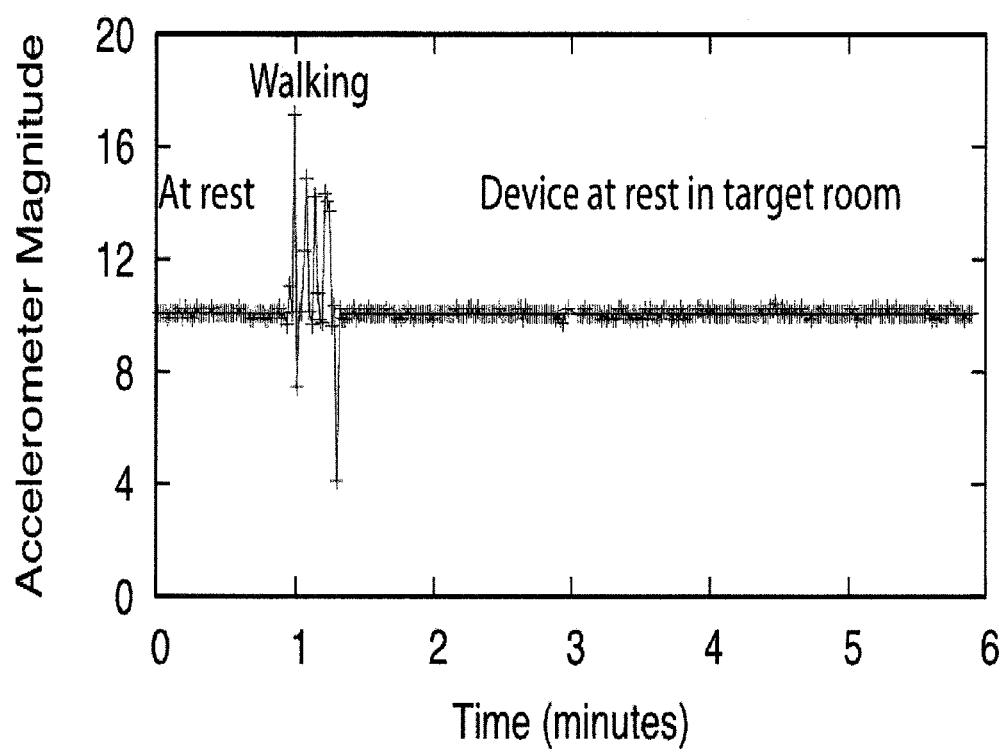
Figure 7:
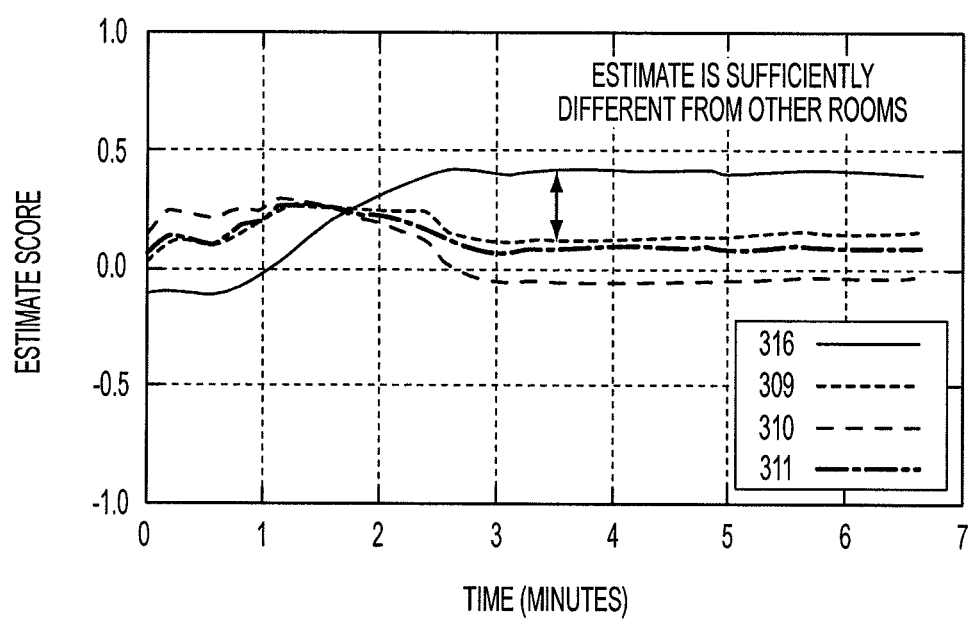
Figure 8:
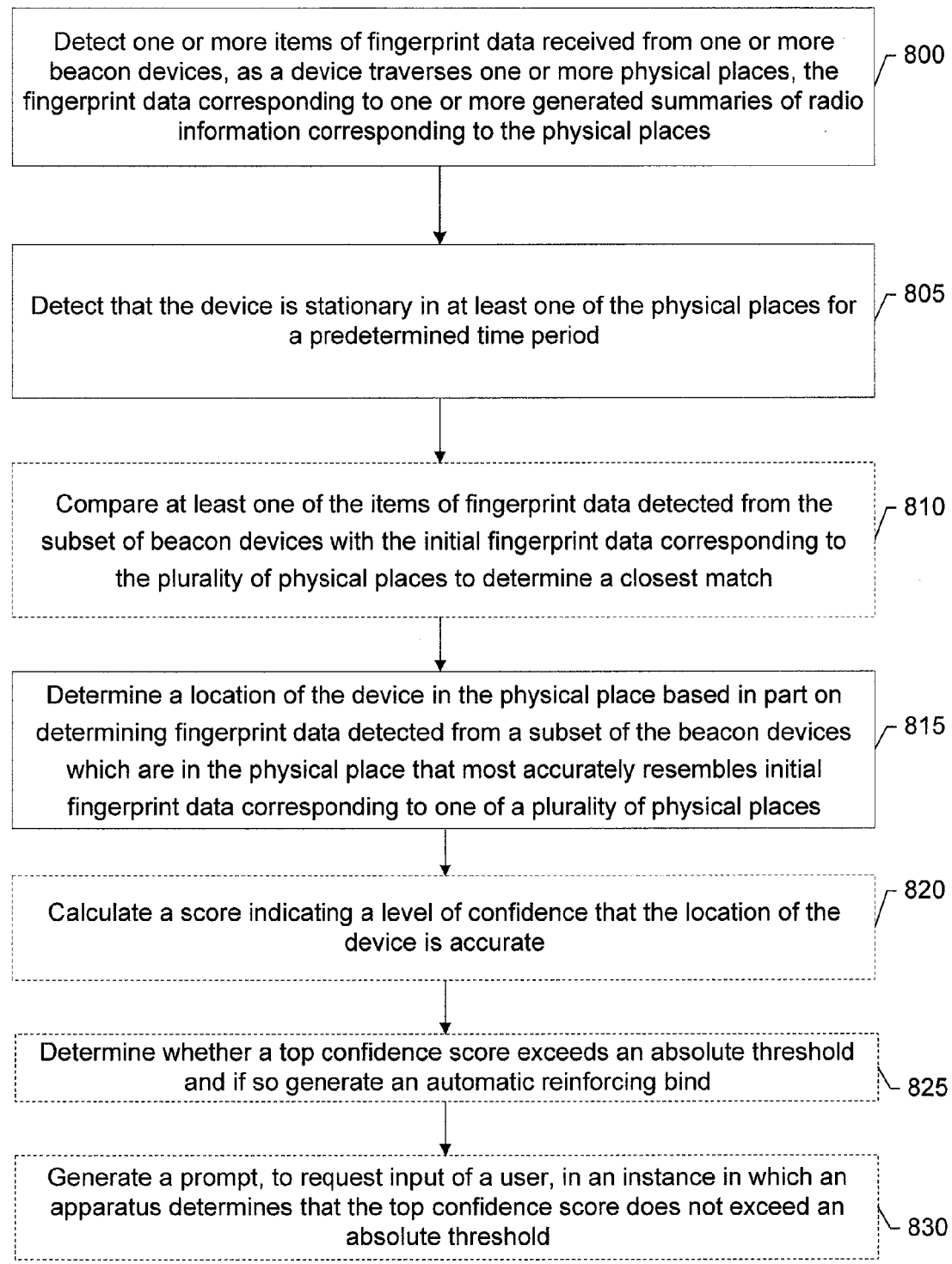

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a network device according to an example embodiment of the invention;

FIG. 4 is a schematic block diagram of a geopositioning system according to an example embodiment of the invention;

FIG. 5 is a diagram illustrating a floor plan of a building according to an example embodiment of the invention;

FIG. 6 is a diagram illustrating a magnitude of acceleration of an apparatus according to an example embodiment of the invention;

FIG. 7 is a diagram illustrating confidence scores for four rooms during the same time period according to an example embodiment of the invention; and FIG. 8 illustrates a flowchart for automatically creating associations between one or more places and their fingerprints according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a "fingerprint(s)," "fingerprint data" or the like may refer to one or more summaries of radio information (e.g., ambient radio information), signals or the like that may, but need not uniquely, identify a physical space(s) (e.g., of a structure or entity) place(s), location(s), area(s), region(s) or the like. As used herein, the term "fingerprint(s)" may be referred to herein interchangeably as a "signature(s)," and the terms "fingerprint data" may be referred to herein interchangeably as "signature data".

As referred to herein a "bind(s)," "binding" and similar terms may, but need not, be used to refer to linking a fingerprint(s) to a place(s). The bind(s) may be generated automatically by an apparatus or in response to receipt of a selection by a user of the apparatus.

Additionally, as used herein, one or more radio frequency devices (e.g., access points (e.g., Wi-Fi access points, RF access points, BT access points, IR access points, etc.) and/or cellular towers (e.g., base stations)) may be referred to herein as beacons, beacon devices or the like.

As used herein a "scan," "scanning" and similar terms may be referred to herein to denote receipt by a communication device of signal (e.g., a beacon signal) from one or more access points. Additionally, as used herein, a place(s), a physical place(s) (e.g., a room(s) of a building/structure) and similar terms may refer to a physical space, a location (e.g., an outdoor location(s), an indoor location(s), etc.), a region(s), an area(s), etc.

As referred to herein, canonical fingerprint data may, but need not, relate to initial fingerprint data (e.g., fingerprint data obtained via an initial or first bind) for a place(s), space(s), location(s) or the like as well as subsequent fingerprint data (e.g., fingerprint data obtained via one or more subsequent binds) for the place(s), space(s), location(s) or the like. As referred to herein, subsequent binds may be merged with or replace previous binds and a device (e.g., a network device (e.g., a shared server)) may convert the subsequent binds into a current canonical fingerprint for a particular place(s), space(s), location or the like. One or more communication devices may periodically cache their own copies of canonical fingerprints of areas that are physically close to the communication devices. In this manner, canonical fingerprints may be stored in a shared memory (e.g., a database) of fingerprints. As such, binds and/or fingerprints may be shared directly among communication devices, and need not be accessed via a network device (e.g., a shared server) in all instances.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus for detecting fingerprint data and generating one or more associations between places and corresponding fingerprints. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, a fingerprint detector 78, a positioning sensor 72 and a localizer device 71. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may also store data received from one or more radio frequency devices (e.g., access points (e.g., Wi-Fi access points, RF access points, BT access points, IR access points, etc.) and/or cellular towers (e.g., base stations)). Additionally, the memory device 76 may store fingerprint data associated with one or more places (e.g., rooms, buildings, offices, etc.). The fingerprint data may be utilized to determine the location of the places. In one example embodiment, the fingerprint data may be stored in a fingerprint database of the memory device 76.

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

As shown in FIG. 2, the apparatus 50 may also include one or more means for sharing and/or obtaining data. For example, the apparatus may comprise a short range radio frequency (RF) transceiver and/or interrogator 64 so data may be shared with and/or obtained from electronic devices (e.g., a RF access point(s)) in accordance with RF techniques. The apparatus may comprise other short range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be configured to operate according to Wibree™ radio standards. The apparatus 50 may also include a Wi-Fi transceiver 69 configured to transmit and/or receive data from electronic devices (e.g., a Wi-Fi access point(s)) according to a Wireless Fidelity (Wi-Fi) technique. In this regard, the apparatus 50 and, in particular, the short range transceiver may be capable of transmitting data to and/or receiving data from electronic devices (e.g., an IR access point(s), a BT access point(s), a Wi-Fi access point(s), etc.) within a proximity of the apparatus, such as within 10 meters, for example. Although not shown, the apparatus 50 may be configured to transmit and/or receive data from electronic devices according to various wireless networking techniques, including WLAN techniques such as IEEE 802.11 techniques, and/or the like.

In addition, the apparatus 50 may include a positioning sensor 72. The positioning sensor 72 may be any means such as a device or circuitry embodied in either hardware or a combination of hardware and software that is configured to determine the speed, velocity or acceleration of the apparatus 50 as well as a position(s) or location(s) of the apparatus 50. The positioning sensor 72 may determine the speed and acceleration in which the apparatus 50 is moving or traveling along a path or route, for example through timed location updates. For instance, the positioning sensor 72 is configured to determine the speed and acceleration in which the apparatus 50 is traveling based on changes in position at respective times. In this regard, the positioning sensor 72 is configured to determine the time that it takes the apparatus 50 to move from a first location to a second location in order to determine the speed in which the apparatus 50 is moving or travelling. In an example embodiment, the positioning sensor 72 may include a motion detection unit (e.g., an accelerometer, a gyrometer with associated algorithms) for obtaining the speed in which the apparatus 50 is traveling or moving. The positioning sensor 72 may also determine an instance in which the apparatus 50 is stationary, idle, motionless or at rest. The positioning sensor 72 may determine that the apparatus is stationary, idle, motionless or at rest in an instance in which the positioning sensor 72 determines that the speed, velocity or acceleration of the apparatus 50 is zero.

Additionally, the positioning sensor 72 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information. In this regard, for example, the position history may define a series of data points corresponding to positions or locations of the apparatus 50 at respective times. Various events or activities of the apparatus 50 may also be recorded in association with position history or location information provided by the positioning sensor 72.

In an example embodiment, the processor 70 may be embodied as, include or otherwise control the fingerprint detector. The fingerprint detector 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the fingerprint detector 78, as described below. Thus, in an example in which software is employed, a device or circuitry (e.g., the processor 70 in one example) executing the software forms the structure associated with such means.

The fingerprint detector 78 may facilitate detection of a location of the apparatus 50 based in part on providing data associated with one or more received signals from one or more beacons (e.g., access points and/or one or more cellular towers) to a network device, as described more fully below. For purposes of illustration and not of limitation, the fingerprint detector 78 may, but need not, facilitate detection of a location of the apparatus 50 in an instance in which GPS may be unavailable or imprecise for determining a current location of the apparatus 50. For example, GPS may be, but need not be, unavailable or imprecise for determining the location of apparatus 50 in an instance in which the apparatus 50 is located indoors, located in an urban area or in any other instance in which signals from GPS satellites may be weak or may be difficult to receive by the positioning sensor 72.

The fingerprint detector 78 may detect signals received from one or beacons (e.g., radio frequency (RF) devices), including but not limited to one or more access points such as, for example, RF access points, Wi-Fi access points, BT access points, IR access points. The beacons may also include but are not limited to one or more cellular towers (e.g., base stations 44, 45, 46 of FIG. 4). In an example embodiment, the fingerprint detector 78 may receive detected signals from one or more RF access points (e.g., RF access point 30 of FIG. 4) and one or more Wi-Fi access points (e.g., Wi-Fi access point 32 of FIG. 4), via the RF transceiver 64 and the Wi-Fi transceiver 69, respectively. Additionally, the fingerprint detector 78 may receive detected signals from one or more BT access points (e.g., BT access point 34 of FIG. 4) and one or more IR access points (e.g., IR access point 36 of FIG. 4) via the BT transceiver 68 and IR transceiver 66, respectively. The fingerprint detector 78 may detect the signals received from one or more access points when the apparatus 50 is within a proximity or range of the access points. The detected signals from the access points may include, but is not limited to, data indicating the received signal strength of the signals detected from the access points, one or more network addresses, or other identifiers identifying a corresponding access point(s), the response rate of the access points, and any other suitable data. The response rate of the access points may correspond to how often or the frequency in which the fingerprint detector 78 hears from or detects signals from the access points. In an example embodiment, the fingerprint detector 78 may estimate or determine the locations of the access points based in part on utilizing triangulation based indoor positioning.

As described above, the fingerprint detector 78 may also detect signals from one or more cellular towers (e.g., base stations 44, 45, 46 of FIG. 4). The fingerprint detector 78 may detect signals from the cellular towers in an instance in which the apparatus 50 is within a range of the cellular towers. The range may be the range within which the apparatus 50 may reliably connect to one or more of the cellular towers. The data of the signals received from one or more of the cellular towers may include, but is not limited to, the received signal strength of signals received from respective cellular towers, data identifying (e.g., a cell tower identifier (ID) (e.g., a base station ID)) a respective cellular tower, and any other suitable information.

The data (also referred to herein as fingerprint data or the like) associated with the signals of the access points and/or the cellular towers by the fingerprint detector 78, may be sent to a network device (e.g., network device 90 of FIG. 3) and the network device may utilize the data, in part, to determine a current location of the apparatus 50. The determined current location may be provided to the fingerprint detector 78.

In an instance in which the apparatus 50 enters a location(s) (e.g., an indoor location), such as for example, a distinguishable place(s) (e.g., a room(s)) within a structure (e.g., a building) or the like, the fingerprint detector 78 may determine a fingerprint for the place based in part on detecting one or more signals from one or more beacons of the place (e.g., a room(s)) within a structure). The fingerprint of the room may be provided to the localizer device 71 which may compare the fingerprint of the room with one or more prestored fingerprints corresponding to one or more rooms. The prestored fingerprints (e.g., baseline fingerprints, initial fingerprints, etc.) of the rooms may be stored in memory device 76 (e.g., in a fingerprint database of memory device 76). In this regard, the localizer device 71 may determine a closest match among one of the prestored fingerprints of a place (e.g., room) to the fingerprint of the place (e.g., room) provided by the fingerprint detector 78. The localizer device 71 may determine that the closet match corresponds to a place (e.g., room) that the apparatus 50 is currently located within, as described more fully below.

The localizer device 71 may be any means such as a device or circuitry operating in accordance with software or otherwise embodied in hardware or a combination of hardware and software (e.g., processor 70) operating under software control, the processor 70 embodied as an ASIC or FPGA specifically configured to perform the operations described herein, or a combination thereof) thereby configuring the device or circuitry to perform the corresponding functions of the localizer device 71, as described below. Thus, in an example in which software is employed, a device or circuitry (e.g., the processor 70 in one example) executing the software forms the structure associated with such means.

The localizer device 71 may obtain fingerprint data from the fingerprint detector 78. The fingerprint data may correspond to fingerprints of one or more places (e.g., rooms) in an example embodiment. The fingerprints of the places (e.g., rooms) may be based on signals detected by the fingerprint detector 78 from one or more beacons (e.g., Wi-Fi APs) of the corresponding places (e.g., rooms). The localizer device 71 may compare the fingerprint data of a place(s) (e.g., room(s)) provided by the fingerprint detector 78 to one or more prestored fingerprints (e.g., stored in a fingerprint database) of respective places (e.g., rooms (e.g., rooms 308, 309, 310, 311 of a building, etc.)). In this regard, the localizer device 71 may analyze the data of the prestored fingerprints and the fingerprint data corresponding to a place(s) provided by the fingerprint detector 78. In this manner, the localizer device 71 may determine that the fingerprint data (e.g., fingerprint data of a room 316) provided by the fingerprint detector 78 that most closely matches one of the prestored fingerprints of a place (e.g., room 319) corresponds to the place (e.g., room 319) that the apparatus 50 is currently within.

In an instance in which the localizer device 71 is confident that the closest matching place (e.g., room) is the place that the apparatus 50 is currently within for an extended period of time (e.g., the apparatus 50 is stationary within a room for a predetermined time), the localizer device 71 may create a bind(s) (also referred to herein as a reinforcing bind(s)). In one example embodiment, the bind(s) created by the localizer device 71 may automatically store the fingerprint data corresponding to the place (e.g., room), provided by the fingerprint detector 78 to the localizer device 71, in memory device 76 (e.g., in a fingerprint database of memory device 76). As such, the fingerprint data of the place provided by the fingerprint detector 78 may be stored along with the prestored fingerprints of the corresponding places. In this regard, the memory device 76 storing the fingerprints of corresponding places (e.g., rooms) of a structure may be updated. As such, the newly stored fingerprint data may, but need not be utilized, as baseline fingerprint data for determining whether the apparatus 50 is within the place(s) (e.g., room(s) (e.g., room 319)) on a subsequent occasion (for example, in an instance in which the apparatus 50 subsequently enters a room and the fingerprint detector 78 receives signals from beacons of the room). An alternative to waiting until the predetermined time is to wait until the positioning sensor 72 detects movement, whereupon all of the scans that were collected when the apparatus 50 was stationary may be included in the automatic reinforcing bind.

In an example embodiment, the localizer device 71 may be confident that the closest matching room is the room the apparatus 50 is currently within in an instance in which a confidence score is above a predetermined threshold, as described more fully below.

In some example embodiments, in an instance in which the localizer device 71 is not confident as to a place that the apparatus 50 is currently within based on analyzing received fingerprint data in comparison to prestored fingerprint data corresponding to one or more places (e.g., rooms), the localizer device 71 may provide a prompt (e.g., via display 85) to a user of apparatus 50 requesting the user to specify the location (e.g., a room/space that the apparatus is within) of the apparatus 50. In response to receipt of the input from the user specifying the data, the localizer device 71 may store the fingerprint data for the location (e.g., the room/space) in memory device 76 (e.g., a fingerprint database of the memory device 76) and/or a memory element of a network device, as described more fully below. In this regard, more current fingerprint data for a corresponding location (e.g., room/space) may be collected and added to a fingerprint database collection for a particular location (e.g., room/space).

In some example embodiments, in an instance in which the localizer device 71 creates a bind(s) the localizer device 71 may provide the fingerprint data of a corresponding place obtained from the fingerprint detector 78 to a network device (e.g., network device 90 of FIG. 3). The network device may include a memory element (e.g., a fingerprint database) that stores fingerprints corresponding to places (e.g., rooms/spaces of structures) as well as any other suitable locations. The network device may, but need not, provide the fingerprint data received from the localizer device 71 to one or more other devices (e.g., other apparatus 50) for usage in determining a closest matching place (e.g., room) that the other devices may be within.

Referring now to FIG. 3, a block diagram of one example of a network device is provided. In one example embodiment, the network device 90 may provide services (e.g., location services) to one or more devices (e.g., an apparatus 50). As shown in FIG. 3, the network device (e.g., a server (e.g., communication device 20)) generally includes a processor 94 and an associated memory 96. The memory 96 may comprise volatile and/or non-volatile memory, and may store content, data and/or the like. For example, the memory may store content, data, information, and/or the like transmitted from, and/or received by, the network device. Also for example, the memory 96 may store client applications, instructions, and/or the like for the processor 94 to perform the various operations of the network device in accordance with an embodiment of the invention, as described herein. The memory 96 may include data associated with one or more fingerprints for one or locations. For example, the memory 96 may include one or more fingerprints of corresponding rooms. In an alternative example embodiment, the fingerprints of the locations which may include the fingerprints of the corresponding places (e.g., rooms) may be stored in a fingerprint database 93 (also referred to herein as canonical fingerprint database 93).

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

In an example embodiment, the processor 94 may be embodied as, include or otherwise control the location detector 97. The location detector 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the location detector 97, as described below. Thus, in an example in which software is employed, a device or circuitry (e.g., the processor 94 in one example) executing the software forms the structure associated with such means.

The location detector 97 may receive fingerprint data from the fingerprint detector 78 of an apparatus 50. The fingerprint data may, but need not, correspond to updated fingerprint data associated with one or more locations. For instance, the updated fingerprint data may relate to one or more rooms/spaces. For purposes of illustration and not of limitation consider an instance in which there is an access point A that is part of a canonical signature for room 319 and that there are four total access points (e.g., access points A, B, C, D) that makeup the signature of, or are part of the signature for room 319. Consider that a device such as, for example, apparatus 50, may prestore this signature for room 319. In this example, also presume that access point A is subsequently removed from room 319 or the surrounding physical area, where it would be a part of the fingerprint. In this regard, in an instance in which the apparatus 50 is subsequently within room 319 and is stationary for extended time period (e.g., a predetermined time period, for example 10 minutes) and confident of the location of room 319, the apparatus 50 may determine that the new or updated signature for room 319 is based on access points B, C and D. As such, the localizer device 71 of the apparatus 50 may generate a bind(s) (e.g., automatic bind(s), and may provide data to the location detector 97 indicating that the signature for room 319 no longer includes data (signals) for access points A, B, C, D, but rather the signature for room 319 includes data for access points B, C, D. The location detector 97 may store the updated signature data for room 319 in the fingerprint location data of the memory 96 (or in the fingerprint database 93). The canonical fingerprint for room 319 may also be updated to include any changes in the radio characteristics of access point A, for example, changes in received signal strength or response rate.

As such, based in part on the apparatus 50 being stationary and the apparatus 50 determining that it is confident that it is in room 319, the apparatus 50 may be capable of creating a reinforcing entry (e.g., a bind) in a one or more memories (e.g., memory device 76, memory 96) indicating that the signature for room 319 is currently based on access points B, C, D.

In response to receiving the updated signature for room 319 in this example embodiment, the location detector 97 may, but need not, provide the updated signature for room 319 to one or more other devices (e.g., apparatuses 50) to enable the other devices to utilize the updated signature for room 319 in an instance in which the devices may be determining whether they are subsequently located within room 319.

As such, some example embodiments may over time enable updating of signatures for locations even in instances in which one or more beacons (e.g., Wi-Fi access points or cell towers) for the location (e.g., a room/space) are moved for, turned off or a new beacon(s) is added for the location. By capturing and identifying these changes automatically, the apparatus 50 and/or the network device 90 may maintain the accuracy of the signatures for locations of a geopositioning system over time.

In one example embodiment, the location detector 97 may not replace an initial (e.g., original) signature (e.g., an initial signature for room 310) with an updated signature (e.g., an updated signature for room 319) in fingerprint data of a memory element (e.g., memory 96). In this regard, the location detector 97 may, for example, merge the signatures (e.g., the initial signature and the updated signature). For purposes of illustration and not of limitation, in an instance in which the location detector 97 received three automatic binds for a corresponding room(s) (e.g., room 319) during a time period (e.g., a day), the location detector 97 may merge the three signatures as one signature for the corresponding room(s).

In this example, in an instance in which a first apparatus 50 entered a room (e.g., room 319) and detected access points A, B, C, D and a second apparatus 50 detected access points B, C, D in the room and third apparatus 50 entered the room and detected access points B, C, D during a time period, the location detector 97 may decide to merge the corresponding signatures upon receipt of the corresponding signature data for the room (e.g., room 319) from the first apparatus 50, the second apparatus 50 and the third apparatus 50.

In some example embodiments, the location detector 97 may determine to change the initial signature (e.g., a default signature) for a corresponding room (e.g., room 319) in response to receipt of a predetermined amount (e.g., updated signature data for the room from a predefined number of apparatuses 50) of updated signature information for room. In an alternative example embodiment, the location detector 97 may determine to change the initial signature (e.g., the default signature) based on the most recent signature data received for a room from an apparatus 50 in an instance in which a predetermined number of apparatuses 50 provide updated signature data for the room to the location detector 97.

In another alternative example embodiment, the location detector 97 may determine to change an initial signature (e.g., a default signature) to correspond to updated signature data for a corresponding room(s) based in part on a level of trust assigned to a user of an apparatus 50 that provided updated signature data associated with the room(s) to the location detector 97.

Referring now to FIG. 4, an example embodiment of a system for augmenting associations between places and fingerprint data is provided. The system 7 may include one or more beacons such as for example, access points (APs). The APs may include, for example, a RF AP 30, a Wi-Fi AP 32, a BT AP 34 and an IR AP 36. The system 7 (also referred to herein as geolocation system 7) may also include one or more beacons such as, for example, cellular towers. The cellular towers may include, for example, base stations (BSs) 44, 45, 46. Additionally, the system 7 may include one or more communication devices 165 and 167 (e.g., apparatuses 50 (e.g., mobile terminal 10)) as well as a network device 110 (e.g., network device 90). In the example embodiment of FIG. 4, the network device 110 may provide location based services to the communication devices 165 and 167. The location based services may include one or more updated items of fingerprint data corresponding to a location(s) (e.g., a room(s)). Additionally, in some example embodiments, the communication devices 165, 167 may detect fingerprint data (e.g., updated fingerprint data) of a location(s) (e.g., a room(s)) and may provide the fingerprint data to the network device to enable the network device to store and provide the fingerprint data to other communications devices (e.g., apparatuses 50).

Although FIG. 4 shows one RF AP 30, one Wi-Fi AP 32, one BT AP 34, one IR AP 36, three cellular towers (e.g., BS's 44, 45, 46), two communication devices 165, 167, and a network device 110, it should be pointed out that any suitable number of RF APs 30, Wi-Fi APs 32, BT APs 34, IR APs 36, cellular towers (e.g., BS's), communication devices 165, 167, and network devices 110 may be part of the system 7 without departing from the spirit and scope of the invention.

In the example of FIG. 4, the communication device 165 may detect signals (e.g., beacons) from one or more access points such as, for example, RF AP 30 and Wi-Fi AP 32. Additionally, the fingerprint detector 78 of the communication device 165 may detect signals from one or more cellular towers (e.g., BS's 44 and 46). The communication device 165 may analyze the data associated with the access points and the cellular towers to obtain fingerprint data which may correspond to information (e.g., radio information) that may be used to define or identify a physical place/space (e.g., a room(s), office(s) or other entit(ies) within a structure (e.g., building(s)), place(s), location(s), area(s), region(s))) or the like. The information may include data associated, in part, with the received response rates and signal strengths of the respective signals received from the RF AP 30, the Wi-Fi AP 32 and the BS's 44 and 46 as well as content associated with the network addresses and/or identifiers of the RF AP 30, the Wi-Fi AP 32, and base station IDs corresponding to the BS's 44, 46.

In an example embodiment, the fingerprint data may correspond to a fingerprint of a place(s) (e.g., room(s)). The fingerprint detector 78 may send this fingerprint data to the localizer device (e.g., localizer device 71) to determine a closest match to corresponding prestored fingerprint data of a place(s) (e.g., room(s)) to enable the communication device 165 to determine the current location of a place (e.g., room) that it is within in an instance in which the communication device 165 is stationary. In an instance in which the fingerprint data for the place(s) (e.g., room(s)) is updated, the communication device 165 may bind the fingerprint data and send the updated fingerprint data for the place(s) (e.g., room(s)) to a location detector (e.g., location detector 97) of the network device 110 (e.g., network device 90). A stationary device may be completely at rest (e.g., on a table), or it may be otherwise detected, by the positioning sensor 71, to not have moved sufficiently to have left the place (e.g., room, outdoor area), for example.

The location detector 97 of the network device 110 may, but need not, provide the updated fingerprint data corresponding to the place(s) (e.g., room(s)) to one or more other devices to enable the devices to determine the location of the place(s) (e.g., room(s)) in an instance in which the devices are subsequently within the place(s) (e.g., room(s)).

The fingerprint detector (e.g., fingerprint detector 78) of a communication device 167 may detect fingerprint data, in a manner analogous to that of the communication device 167, from the BT AP 34, the IR AP 36, the BS 45 and the BS 46. The fingerprint data detected by the fingerprint detector of the communication device 165 may correspond to fingerprint data of a location such as, for example, a room(s). In this regard, the fingerprint detector may provide the fingerprint data to a localizer device (e.g., localizer device 71) of the communication device 167 which may utilize the fingerprint data related to the location or place(s) (e.g., room(s)) to determine a closest match to prestored fingerprint data corresponding to one or more places (e.g., rooms). The closest match may be determined using statistical Nearest Neighbor or probabilistic Bayesian methods, for example. The matching methods may return a score which may connote the confidence in the match and may be used to compare to the confidences in the matches of other fingerprints. The score of a location may be high in absolute terms and larger than other places, in relative terms. The criteria for creating an automatic reinforcing bind may require either or both of these conditions to be met (e.g., above a threshold), in addition to the condition of being stationary.

In an instance in which the fingerprint data for the room(s) is updated, the communication device 165 may bind the fingerprint data and send the updated fingerprint data for the place(s) (e.g., room(s)) to a location detector (e.g., location detector 97) of the network device 110 (e.g., network device 90). The location detector 97 of the network device 110 may, but need not, provide the updated fingerprint data corresponding to the place(s) (e.g., room(s)) to one or more other devices to enable the devices to determine the location of the place(s) (e.g., room(s)) in an instance in which the devices are subsequently within the place(s) (e.g., room(s).

In some example embodiments, at least two behaviors of an apparatus 50 may be evaluated in determining a location of the apparatus 50. For instance, an evaluation may be made as to whether the apparatus 50 is stationary or idle and whether a confidence score regarding the location of the apparatus 50 is above a threshold to enable creation of automatic binds when the localizer device 71 is confident that the apparatus 50 has been in the same, correct place for an extended time period, as described more fully below.

Referring now to FIG. 5, a diagram illustrating a floor plan of a building according to an example embodiment of the invention is provided. FIG. 5 illustrates a physical path 5 that a user of an apparatus 50 took within the building 3. In the example of FIG. 5, the positioning sensor 72 (e.g., the accelerometer of the positioning sensor 72) may detect the apparatus 50 moving within rooms of the building 3. Additionally, the positioning sensor 72 may determine that the user of the apparatus 50 stops moving along the path 5 in room 316. As the apparatus 50 is moved along the path 5, the fingerprint detector 78 of the apparatus 50 may detect beacons while within respective rooms and may determine fingerprint data for the respective rooms (e.g., rooms 310, 311, 316, etc.) based in part on the received signals of the beacons.

As described more fully below, the localizer device 71 of the apparatus 50 may determine that when the apparatus 50 is stationary that the apparatus 50 is within room 316 and may generate a confidence score for room 316. Additionally, the localizer device 71 may determine that the score is sufficiently different (e.g., higher) from the scores, determined by the localizer device 71, for other rooms (e.g., rooms 310, 311, etc.). In an example embodiment, in an instance in which the apparatus 50 remains stationary in room 316 for a predetermined time (e.g., ten minutes) the fingerprint detector 78 may perform scans slowly and based in part upon the detected fingerprint data, the localizer device 71 may apply a bind (e.g., link fingerprint data (for example, updated fingerprint data)) to a place(s) (e.g., a room), as described more fully below. The bind may be stored by the localizer device 71 in a memory (e.g., memory device 76) and/or may be provided to a network device (e.g., network device 90) to enable storage in a remote memory (e.g., memory 96). In this regard, the bind may improve a geolocation system (e.g., geolocation system 7) for the room (e.g., room 316) that the apparatus 50 is within and for other rooms (e.g., rooms 310, 311, etc.).

Referring now to FIG. 6, a diagram illustrating the magnitude of acceleration of an apparatus moving along a path of a building according to an example embodiment is provided. In the example embodiment of FIG. 6, the positioning sensor 72 of an apparatus 50 may detect acceleration before a user of apparatus 50 walks along a path (e.g., path 5) within a building (e.g., building 3) and may detect acceleration during the walk along the path and after the walk.

As such, for time zero to about forty five seconds, the positioning sensor 72 may determine that the apparatus 50 is at rest (for example, in rooms 309, 310) or stationary. Subsequently, the positioning sensor 72 may detect when a user begins walking with the apparatus 50 along a path (e.g., within rooms 311, 321 and 316) at about forty six seconds to about one minute and twenty seconds. In addition, the positioning sensor 72 may determine that during about one minute twenty one seconds to six seconds that the apparatus 50 is at rest or stationary. As shown in FIGS. 5 & 6, the apparatus 50 may be stationary after the user walks with the apparatus in room 316.

In an instance in which the apparatus 50 is stationary after being moved about the path (e.g., path 5), the fingerprint detector 78 may accumulate scans (e.g., one per minute) to determine fingerprint data for a place (e.g., room 316) and may provide the fingerprint data to the localizer device 71 to determine a confidence score for the place (e.g., room 316). In one example embodiment, in an instance in which the apparatus 50 has not been moved for a predetermined time period (e.g., an hour) and has collected a predetermined number of scans (e.g., sixty scans (for example, one scan per minute)) and the localizer device 71 determines that the confidence score for a corresponding place (e.g., room 316) remains high and differentiable from confidence score of other places (e.g., other rooms (e.g., rooms 310, 311, etc.)), the localizer device 71 may create a reinforcing bind for the place (e.g., room 316) in which the apparatus 50 remains stationary. The localizer device 71 may, but need not, create the reinforcing bind automatically and the reinforcing bind may be associated with updated fingerprint data for a place corresponding to prestored or original fingerprint data for the place. In an alternative example embodiment, the apparatus 50 may need to remain stationary for a time period long enough for the fingerprint detector 78 to detect at least a predetermined number of scans (e.g., ten) from beacons in order for the localizer device 71 to obtain a high and differentiable confidence score that the apparatus 50 is within a particular place (e.g., room 316) while stationary.

Referring now to FIG. 7, a diagram illustrating confidence scores for places during a time period according to an example embodiment is provided. As shown in FIG. 7, the confidence scores for places such as, for example, rooms 309, 310, 311 and 316 along a path (e.g., path 5) that an apparatus 50 traveled or traversed is determined by the localizer device 71 based in part on fingerprint data detected from the corresponding rooms (e.g., rooms 309, 310, 311, 316). In the example of FIG. 7, as the apparatus 50 is moved during a time at about forty five seconds up to about a time of two minutes the localizer device 71 is not accurately (e.g., the correct room does not have the highest scores) reflecting detection of the correct location of the apparatus 50. However, after some time in the room (e.g., room 316, for example a target room), in which the apparatus 50 may be stationary up to about two and a half minutes and thereafter, the localizer device 71 may indicate that the apparatus 50 is in the correct room as designated by the room (e.g., room 316) associated the highest confidence score (e.g., approximately 0.4) determined by the localizer device 71. As such, the localizer device 71 is steadily outputting that the apparatus 50 is in room 316 in FIG. 7.

It should be pointed out that in the example embodiment of FIG. 7, the fingerprint detector 78 of the apparatus 50 may detect fingerprint data corresponding to room 316 when the apparatus 50 is stationary in room 316. For example, the fingerprint detector 78 may perform some scans (e.g., Wi-Fi AP scans), and may add the scans together to produce the fingerprint data for room 316. In this regard, the fingerprint detector 78 may provide the fingerprint data to the localizer device 71 which may try to match this fingerprint data against the canonical (e.g., prestored, for example original) fingerprint data corresponding to one or more rooms (e.g., rooms 316, 309, 310, 311). This new fingerprint data may replace the existing canonical fingerprint and may be shared across many localizer devices (e.g., localizer devices 71) of apparatuses 50 and may be stored in a fingerprint database (e.g., a fingerprint database of memory device 76 and/or fingerprint database 93).

In this example embodiment, the localizer device 71 may match the fingerprint data detected by the fingerprint detector 78 for room 316 with the canonical fingerprint data for room 316. Additionally, the localizer device 71 may match the fingerprint data detected by the fingerprint detector 78 for each of the rooms 309, 310 and 311 with the canonical fingerprint data for rooms 309, 310 and 311, as shown in FIG. 7. For instance, FIG. 7 illustrates that the localizer device 71 may output a match between the fingerprint data of the rooms 316, 309, 310, 311 detected by the fingerprint detector 78 and the canonical fingerprint data for each of these rooms. As such, after about 2 minutes, the localizer device 71 may determine that the match between the fingerprint data detected by the fingerprint detector and the canonical fingerprint data for room 316 is the greatest match as compared to the other rooms (e.g., 309, 310, 311).

For example, the confidence score for room 316 is higher than the confidence scores for the other rooms. As such, the localizer device 71 may be confident that the apparatus 50 is currently within room 316 and may, but need not, generate an automatic bind. In this regard, the localizer device 71 may, but need not, augment associations of the fingerprint data for room 316 in a memory (e.g., memory device 76, memory 96) to enable the apparatus 50 to utilize the fingerprint data at a subsequent time or to enable a network device to allow other devices to use the augmented associations of the fingerprint data for room 316. In an example embodiment, the localizer device 71 may automatically generate the bind in an instance in which the highest confidence score is greater than the other confidence scores by a predetermined threshold.

In an instance in which the confidence score is below the predetermined threshold, the localizer device 71 may generate a prompt requesting the user to confirm the location of the apparatus 50. In this example embodiment, the user may indicate that the apparatus 50 is in room 316, in which case a manual reinforcing bind may be created. For example, in an instance in which the user indicated a different room (e.g., 309), a manual reinforcing bind may be created, by the apparatus 50, for that room.

Referring now to FIG. 8, a flowchart of an example method for augmenting one or more associations between places and fingerprints is provided. At operation 800, an apparatus (e.g., fingerprint detector 78) may detect one or more items of fingerprint data received from one or more beacon devices (e.g., APs, BSs), as a device (e.g., apparatus 50) traverses (or moves throughout) one or more physical places (e.g., rooms). The fingerprint data may correspond to one or more generated summaries of radio information corresponding to the one or more physical places. At operation 805, an apparatus (e.g., positioning sensor 72) may detect that the device is stationary in at least one of the physical places (e.g., room 316 of FIG. 5) for a predetermined time period.

Optionally, at operation 810, an apparatus (e.g., localizer device 71) may compare at least one of the items of fingerprint data detected from the subset of beacon devices with the initial fingerprint data corresponding to the plurality of physical places to determine a closest match. At operation 815, an apparatus (e.g., localizer device 71) may determine a location of the device in the physical place based in part on determining fingerprint data detected from a subset of the beacon devices which are in the physical place that most accurately resembles initial fingerprint data corresponding to one of a plurality of physical places (e.g., canonical fingerprint data for room 316 among canonical fingerprint data for rooms 309, 310, 311). Optionally, at operation 820, an apparatus (e.g., localizer device 71) may calculate a score (e.g., score 0.4 of FIG. 7) indicating a level of confidence that the location of the device (e.g., apparatus 50) is accurate.

Optionally, at operation 825, an apparatus (e.g., localizer device 71) may determine whether a top confidence score exceeds an absolute threshold and if so (e.g., a top confidence score—a second confidence score is greater than an absolute (e.g., relative) threshold) the apparatus may generate an automatic reinforcing bind. Optionally, at operation 830, an apparatus (e.g., localizer device 71) may generate a prompt, to request input of a user, in an instance in which an apparatus determines that the top confidence score does not exceed an absolute threshold. In this regard, the user may confirm the location of the device (e.g., apparatus 50) in the physical place based in part on the top confidence score or may indicate a different location (e.g., a different room) of the device. In an instance in which the user confirms the location of the device in the physical place or indicates a different location of the device, an apparatus (e.g., apparatus 50) may generate a "manual bind" that links the user's selection to the fingerprint data collected by the device (e.g., apparatus 50).

It should be pointed out that FIG. 8 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, processor 94, fingerprint detector 78, localizer device 71, location detector 97). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 8 above may comprise a processor (e.g., the processor 70, the processor 94, the fingerprint detector 78, the localizer device 71, the location detector 97) configured to perform some or each of the operations (800-830) described above. The processor may, for example, be configured to perform the operations (800-830) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (800-830) may comprise, for example, the processor 70 (e.g., as means for performing any of the operations described above), the processor 94, the fingerprint detector 78, the localizer device 71, the location detector 97 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    detecting one or more items of fingerprint data received from one or more beacon devices, as a device traverses one or more physical places, the fingerprint data corresponding to one or more generated summaries of radio information corresponding to the one or more physical places;
    detecting that the device is stationary in at least one of the physical places for a predetermined time period;
    comparing at least one of the items of fingerprint data detected from the subset of beacon devices with canonical fingerprint data, comprising initial fingerprint data, corresponding to the physical places to determine a closest match; and
    determining, via a processor, a location of the device in the physical place based in part on determining fingerprint data detected from a subset of the beacon devices which are in the physical place that most accurately resembles canonical fingerprint data corresponding to one of a plurality of physical places.

2. The method of claim 1, further comprising:
    calculating a score indicating a level of confidence that the location of the device is accurate.

3. The method of claim 2, further comprising:
    generating a prompt requesting input regarding the location of the device in an instance in which the score is below a predetermined threshold.

4. The method of claim 1, further comprising: calculating a score indicating a level of confidence that the location of the device is accurate; and automatically generating a bind to obtain a new item of fingerprint data, corresponding to the physical place, that updates the canonical fingerprint data of the one of the physical places with detected different information of the item of fingerprint data to obtain current fingerprint information for the physical place in an instance in which the score is above a predetermined threshold.

5. The method of claim 1, further comprising: calculating a score indicating a level of confidence that the location of the device is accurate; calculating a plurality of confidence scores for each of the one or more physical places; and automatically generating a bind to obtain a new item of fingerprint data, corresponding to the physical place, that updates the canonical fingerprint data of the one of the physical places with detected different information of the item of fingerprint data to obtain current fingerprint information for the physical place in an instance in which the score is higher that the confidence scores by a predetermined value.

6. The method of claim 1, wherein the predetermined time period comprises a time period equal to an amount of time for obtaining a predetermined number of scans from the subset of beacon devices or a time period equal to an amount of time until a movement of the device is detected, wherein a plurality of scans that were collected in an instance in which the device was stationary are included in the bind.

7. The method of claim 1, further comprising: updating the canonical fingerprint data of the one of the physical places to correspond to the at least one item of fingerprint data in an instance in which the subset of beacon devices or characteristics of the beacon devices is different from beacon devices identified in the canonical fingerprint data of the one of the physical places in an instance in a calculated score indicates a level of confidence that the location of the device is accurate.

8. The method of claim 1, wherein:
    the physical places comprise at least one of physical spaces, locations, areas or regions; and
    the physical place comprises a room of a building or an outdoor area.

9. The method of claim 1, wherein detecting that the device is stationary comprises detecting that the device is completely at rest or detecting that the device has not moved enough to leave the physical place.

10. An apparatus comprising:
    at least one processor; and
    at least one memory including computer program code configured to, with the at least one processor, cause the apparatus to perform at least the following:
        detect one or more items of fingerprint data received from one or more beacon devices, as the apparatus traverses one or more physical places, the fingerprint data corresponding to one or more generated summaries of radio information corresponding to the one or more physical places;

detect that the apparatus is stationary in at least one of the physical places for a predetermined time period;

compare at least one of the items of fingerprint data detected from the subset of beacon devices with canonical fingerprint data, comprising initial fingerprint data, corresponding to the physical places to determine a closest match; and determine a location of the apparatus in the physical place based in part on determining fingerprint data detected from a subset of the beacon devices which are in the physical place that most accurately resembles canonical fingerprint data corresponding to one of a plurality of physical places.

11. The apparatus of claim 10, wherein the memory and computer program code are configured to, with the processor, cause the apparatus to:

calculate a score indicating a level of confidence that the location of the device is accurate.

12. The apparatus of claim 11, wherein the memory and computer program code are configured to, with the processor, cause the apparatus to:

generate a prompt requesting input regarding the location of the device in an instance in which the score is below a predetermined threshold.

13. The apparatus of claim 10, wherein the memory and computer program code are configured to, with the processor, cause the apparatus to: calculate a score indicating a level of confidence that the location of the device is accurate; and automatically generate a bind to obtain a new item of fingerprint data, corresponding to the physical place, that updates the canonical fingerprint data of the one of the physical places with detected different information of the item of fingerprint data to obtain current fingerprint information for the physical place in an instance in which the score is above a predetermined threshold.

14. The apparatus of claim 10, wherein the memory and computer program code are configured to, with the processor, cause the apparatus to: calculate a score indicating a level of confidence that the location of the device is accurate; calculate a plurality of confidence scores for each of the one or more physical places; and automatically generate a bind to obtain a new item of fingerprint data, corresponding to the physical place, that updates the canonical fingerprint data of the one of the physical places with detected different information of the item of fingerprint data to obtain current fingerprint information for the physical place in an instance in which the score is higher that the confidence scores by a predetermined value.

15. The apparatus of claim 10, wherein the predetermined time period comprises a time period equal to an amount of time for obtaining a predetermined number of scans from the subset of beacon devices or a time period equal to an amount of time until a movement of the apparatus is detected, wherein a plurality of scans that were collected in an instance in which the apparatus was stationary are included in the bind.

16. The apparatus of claim 10, wherein the memory and computer program code are configured to, with the processor, cause the apparatus to: update the canonical fingerprint data of the one of the physical places to correspond to the at least one item of fingerprint data in an instance in which the subset of beacon devices or characteristics of the beacon devices is different from beacon devices identified in the canonical fingerprint data of the one of the physical places in an instance in a calculated score indicates a level of confidence that the location of the device is accurate.

17. The apparatus of claim 10, wherein:

the physical places comprise at least one of physical spaces, locations, areas or regions; and the physical place comprises a room of a building or an outdoor area.

18. The apparatus of claim 10, wherein the memory and computer program code are configured to, with the processor, cause the apparatus to:

detect that the apparatus is stationary by detecting that the apparatus is completely at rest or detecting that the apparatus has not moved enough to leave the physical place.

19. A computer program product comprising at least one non-transitory computer-readable storage medium having computer-readable program code portions stored therein that are executed by a processor, the computer-readable program code portions comprising:

program code instructions configured to detect one or more items of fingerprint data received from one or more beacon devices, as a device traverses one or more physical places, the fingerprint data corresponding to one or more generated summaries of radio information corresponding to the one or more physical places;

program code instructions configured to detect that the device is stationary in at least one of the physical places for a predetermined time period;

program code instructions configured to compare at least one of the items of fingerprint data detected from the subset of beacon devices with canonical fingerprint data, comprising initial fingerprint data, corresponding to the physical places to determine a closest match; and program code instructions configured to determine a location of the device in the physical place based in part on determining fingerprint data detected from a subset of the beacon devices which are in the physical place that most accurately resembles canonical fingerprint data corresponding to one of a plurality of physical places.

20. The computer program product of claim 19, further comprising:

program code instructions configured to calculate a score indicating a level of confidence that the location of the device is accurate.

* * * * *

UNITED STATES PATENT AND TRADEMARK OFFICE
CERTIFICATE OF CORRECTION

PATENT NO. : 8,977,207 B2
APPLICATION NO. : 13/233905
DATED : March 10, 2015
INVENTOR(S) : Ledlie It is certified that error appears in the above-identified patent and that said Letters Patent is hereby corrected as shown below:

In the claims:

Column 21,
Line 64, "the subset" should read --a subset--.

Column 22,
Line 3, "a subset" should read --the subset--;
Line 33, "is higher that" should read --is higher than--;
Line 49, "in a" should read --in which a--.

Column 23,
Line 7, "the subset" should read --a subset--;
Line 13, "a subset" should read --the subset--;
Line 50, "is higher that" should read --is higher than--.

Column 24,
Lines 11 and 12, "in a" should read --in which a--;
Lines 40 and 41, "the subset" should read --a subset--;
Line 46, "a subset" should read --the subset--.

Signed and Sealed this
Twenty-ninth Day of December, 2015

Michelle K. Lee
*Director of the United States Patent and Trademark Office*